Figure 1:
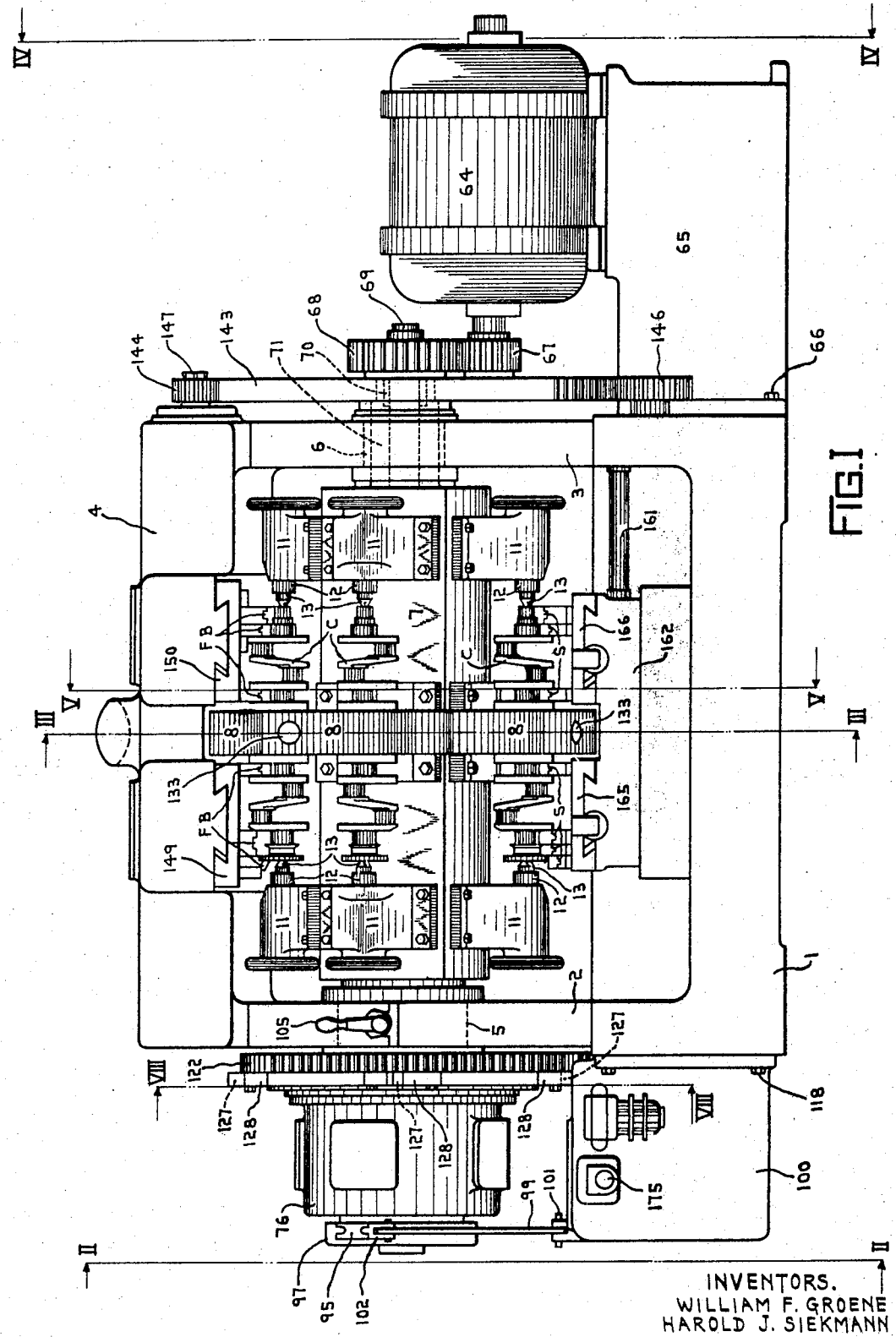

Oct. 5, 1943.    W. F. GROENE ET AL    2,330,968
MULTIPLE SPINDLE BROACHING LATHE INDEXING MECHANISM
Original Filed April 30, 1940    12 Sheets-Sheet 1

INVENTORS.
WILLIAM F. GROENE
HAROLD J. SIEKMANN
BY Willard S. Groene

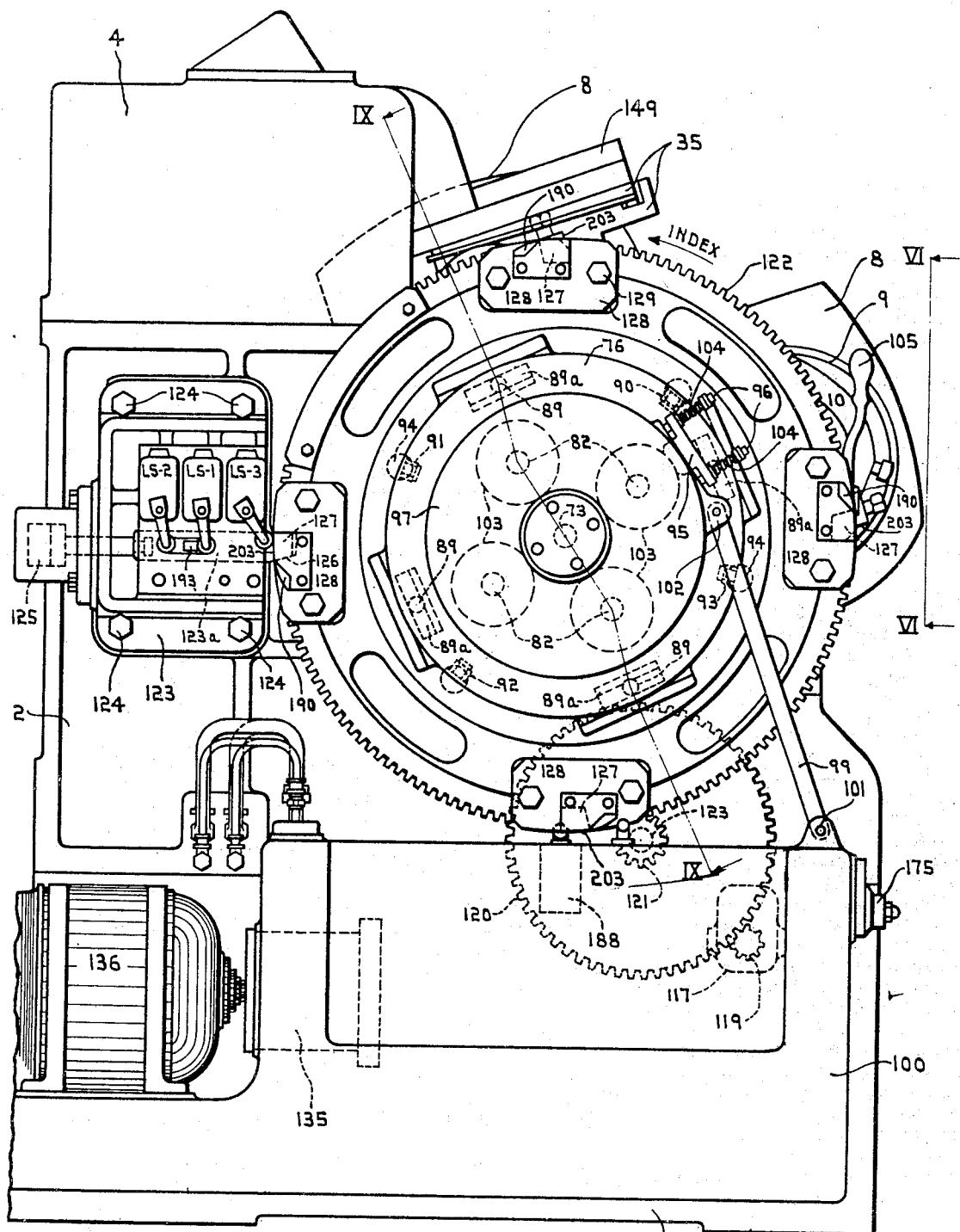

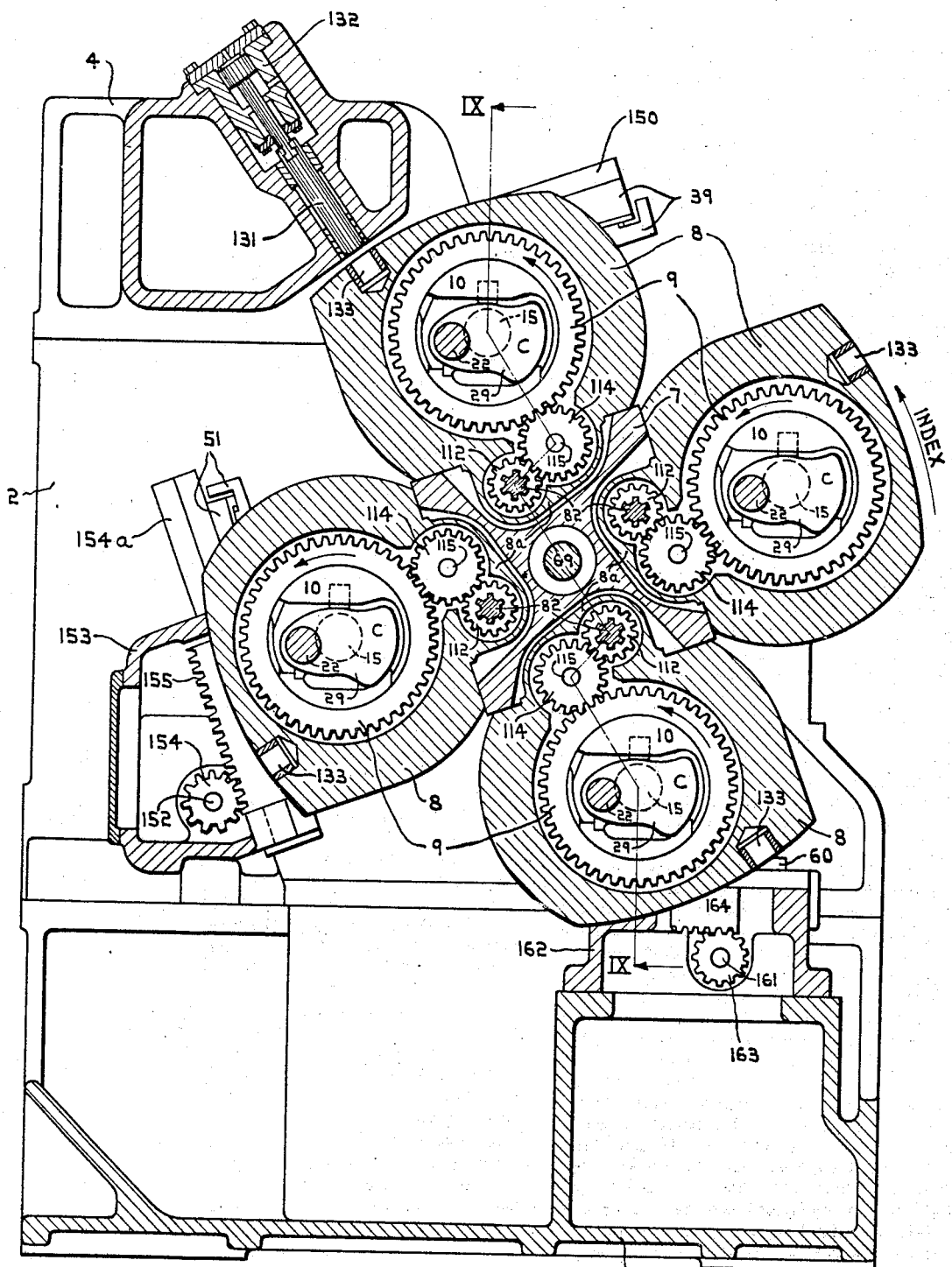
FIG. III

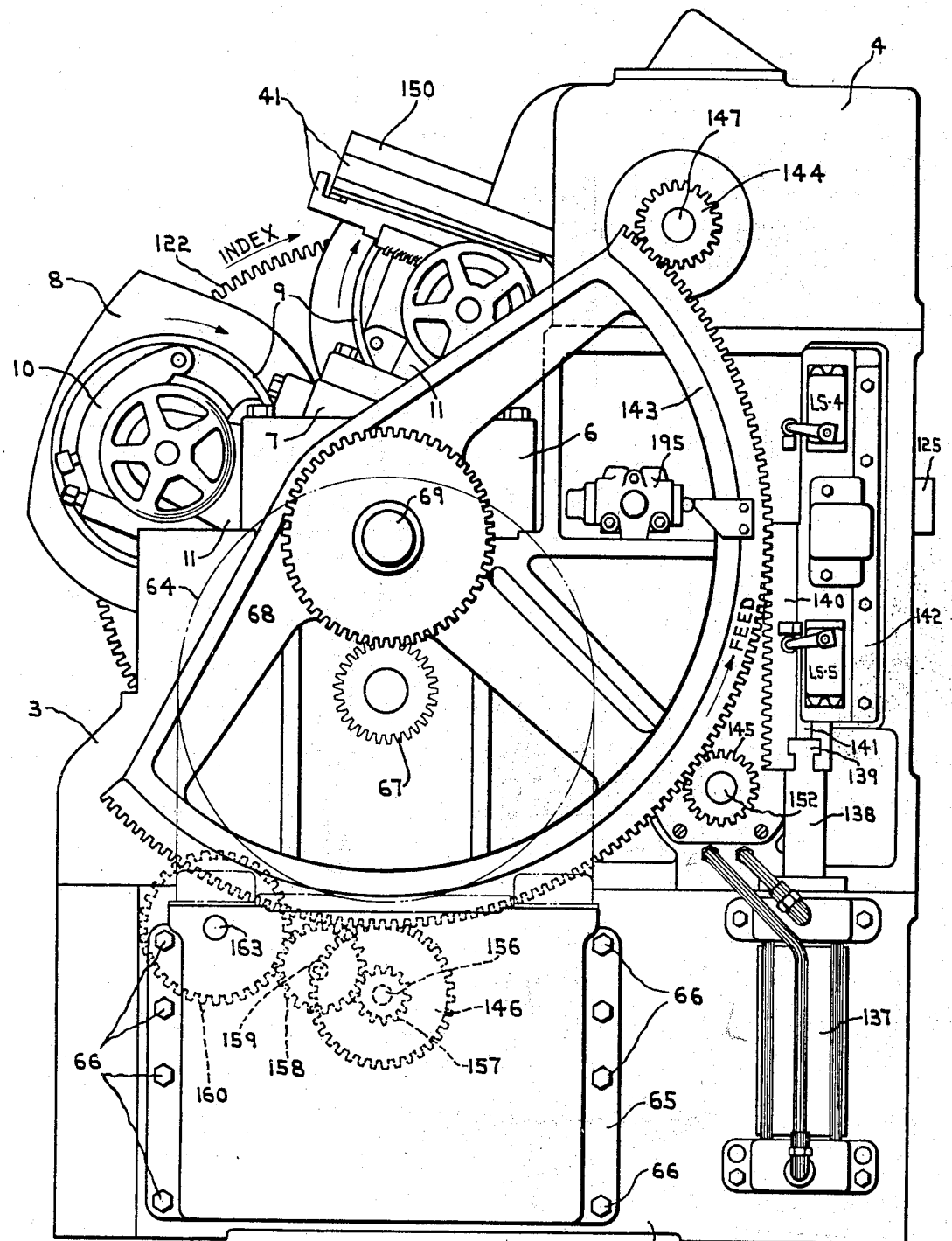
FIG. IV

Oct. 5, 1943.  W. F. GROENE ET AL  2,330,968
MULTIPLE SPINDLE BROACHING LATHE INDEXING MECHANISM
Original Filed April 30, 1940  12 Sheets—Sheet 5
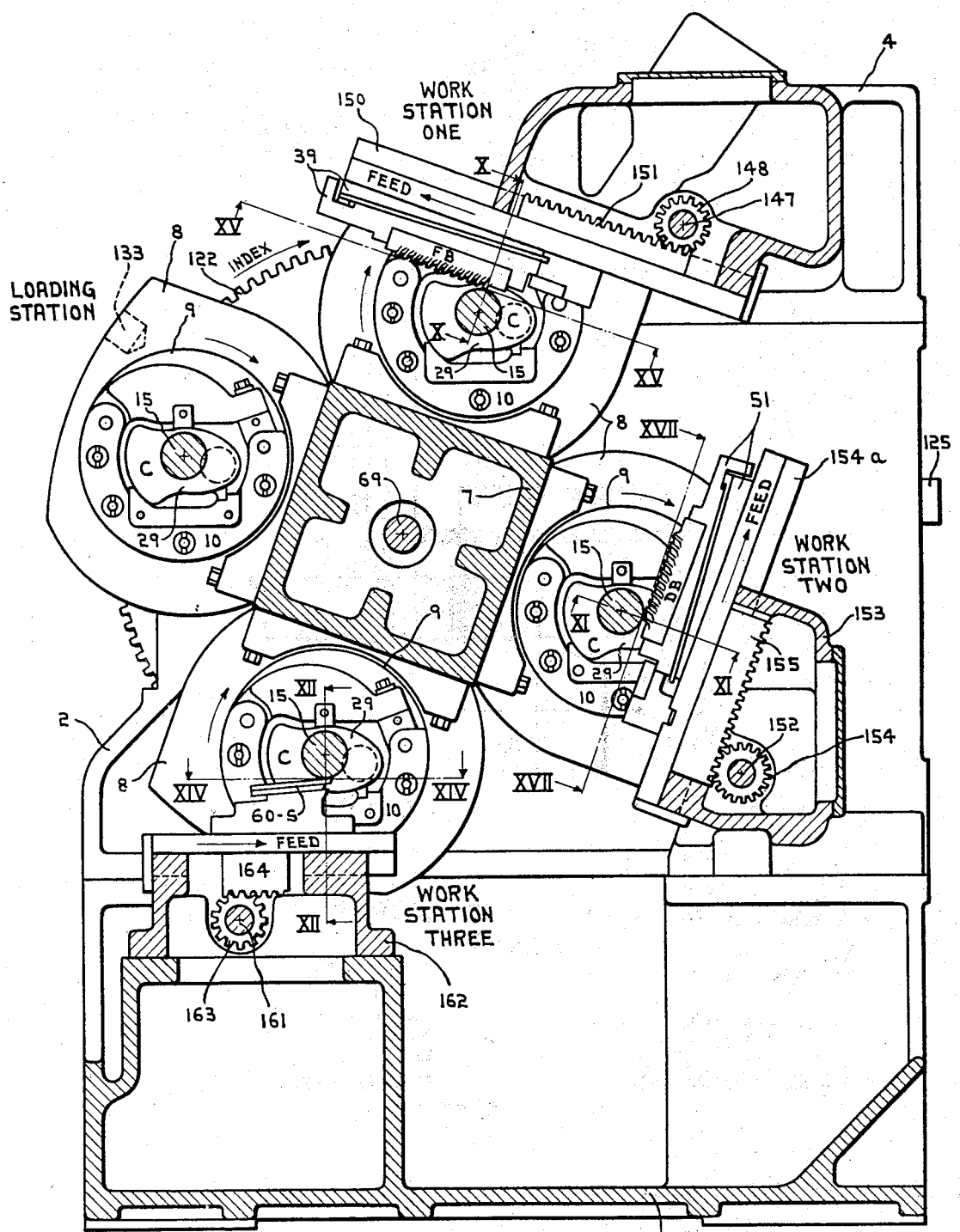
FIG. V
INVENTORS.
WILLIAM F. GROENE
HAROLD J. SIEKMANN
BY William S. Groene

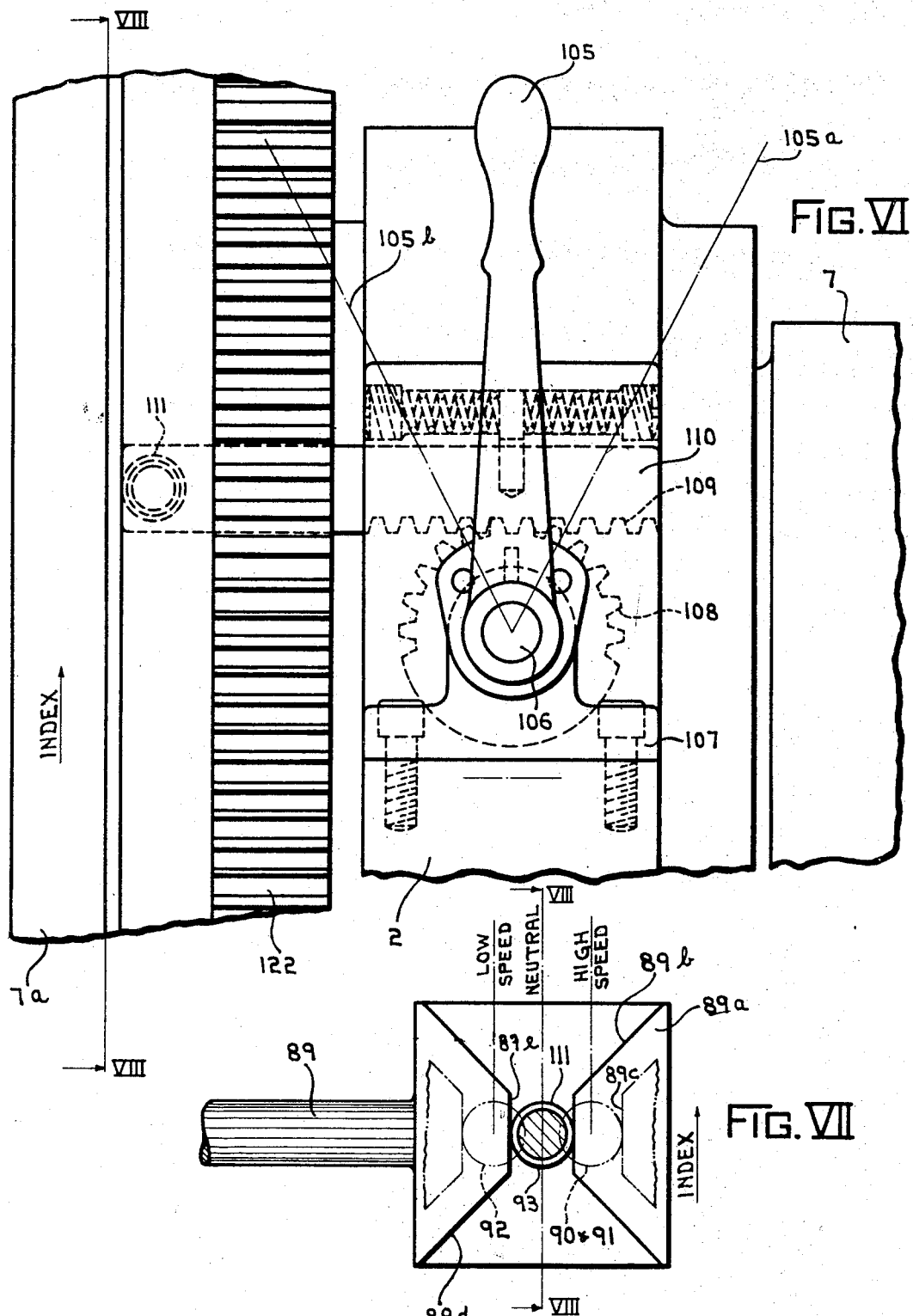

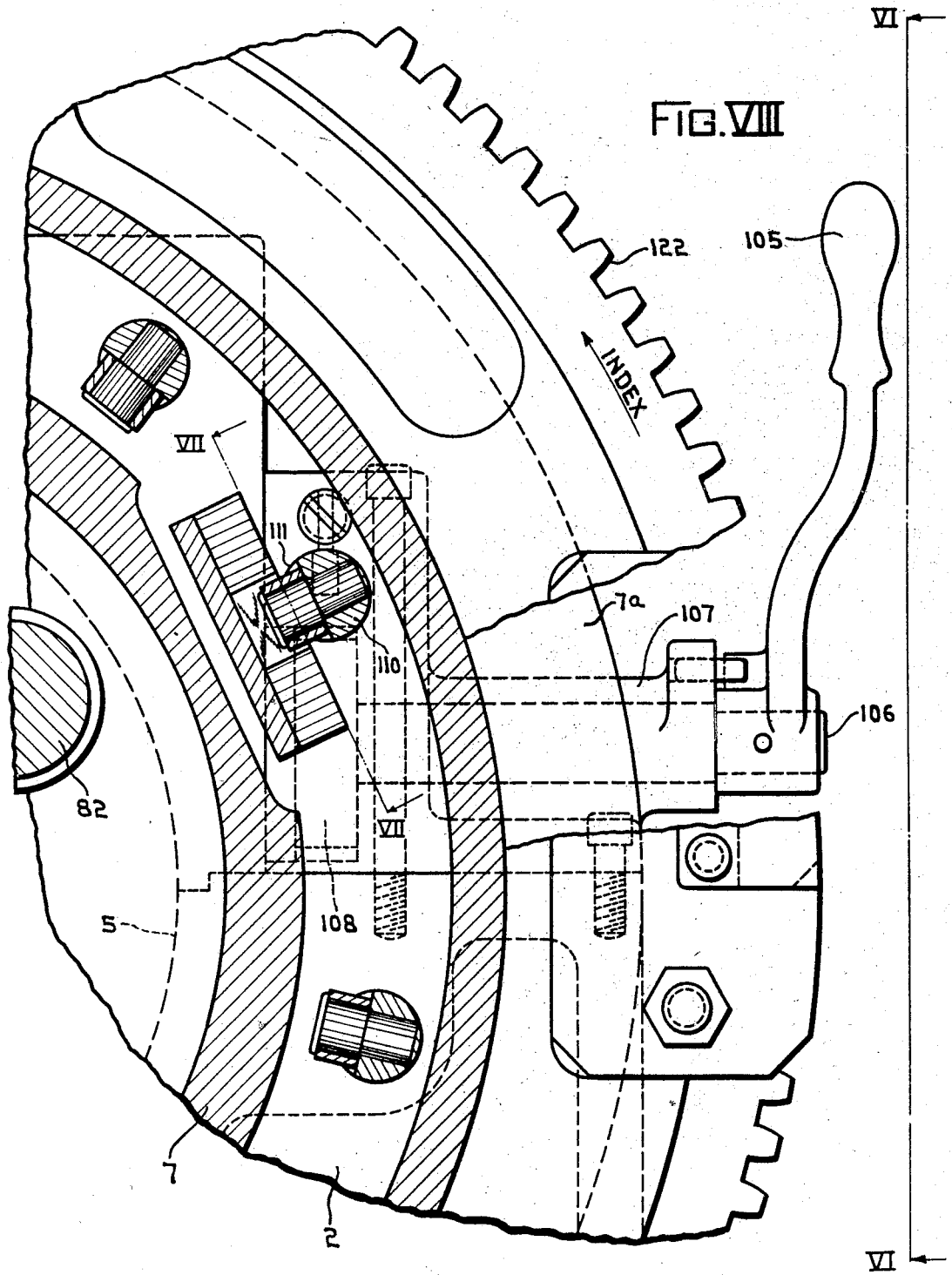

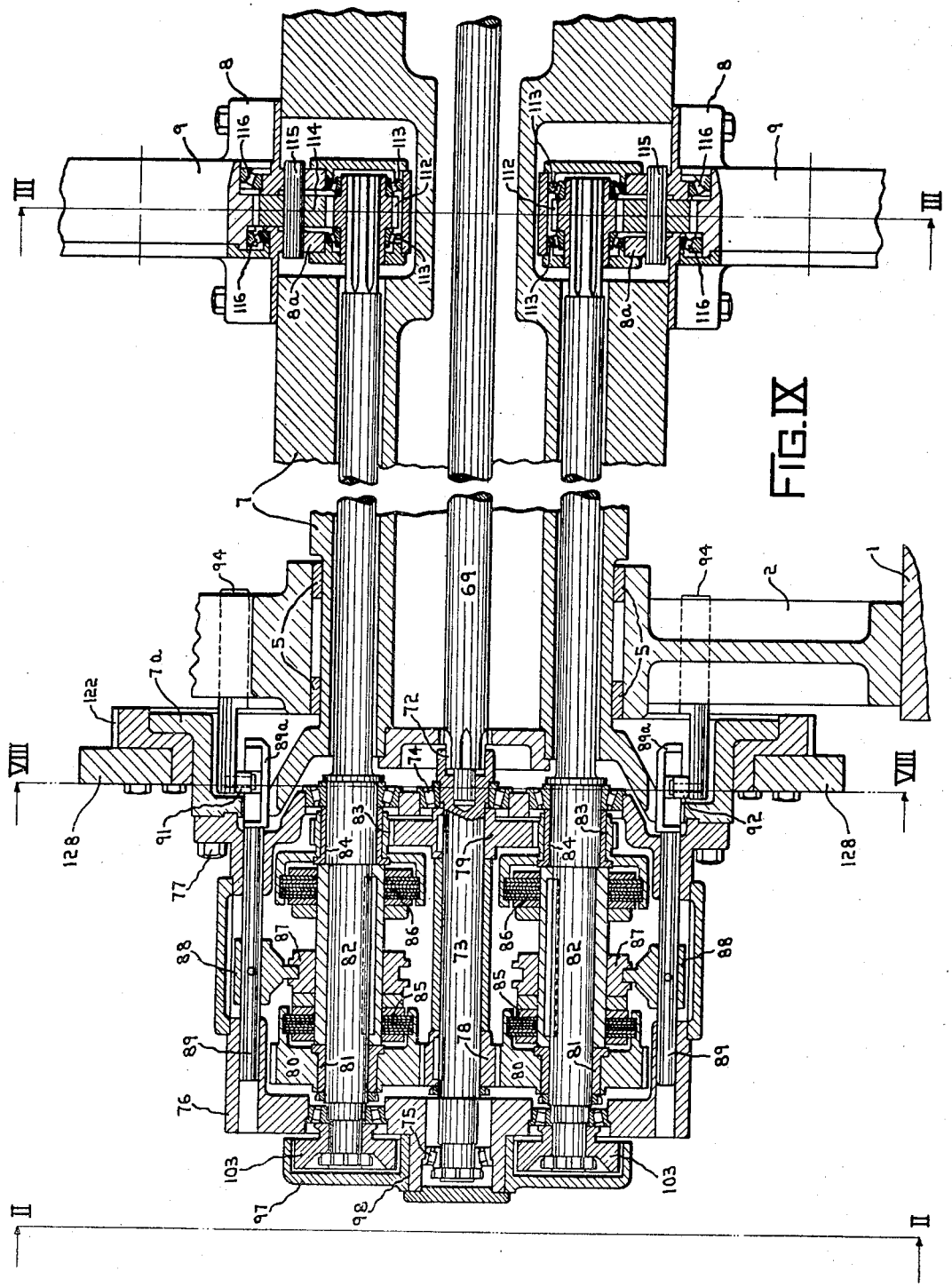

Oct. 5, 1943.   W. F. GROENE ET AL   2,330,968
MULTIPLE SPINDLE BROACHING LATHE INDEXING MECHANISM
Original Filed April 30, 1940   12 Sheets-Sheet 9
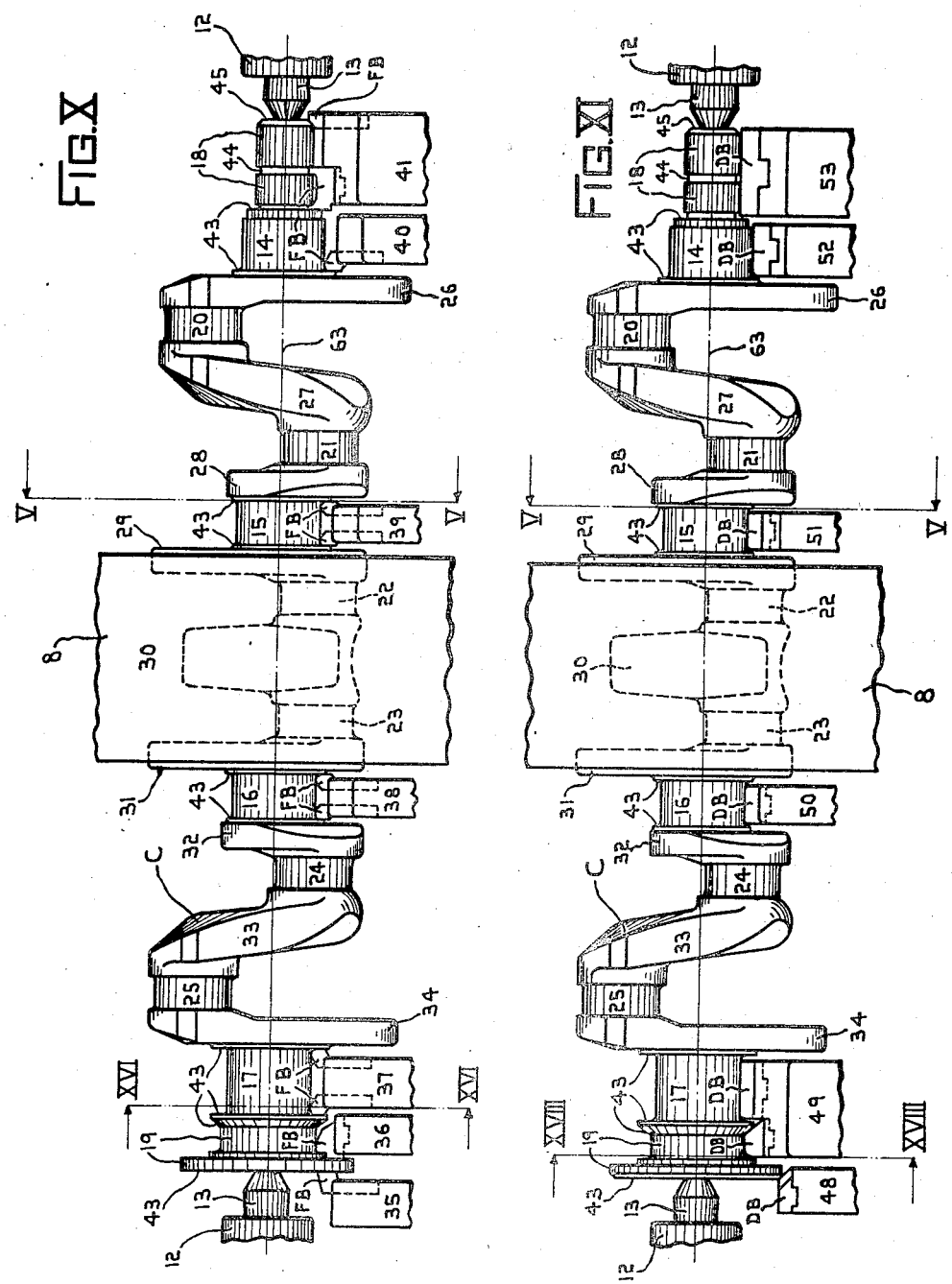
INVENTORS.
WILLIAM F. GROENE
HAROLD J. SIEKMANN
BY Willard L. Groene

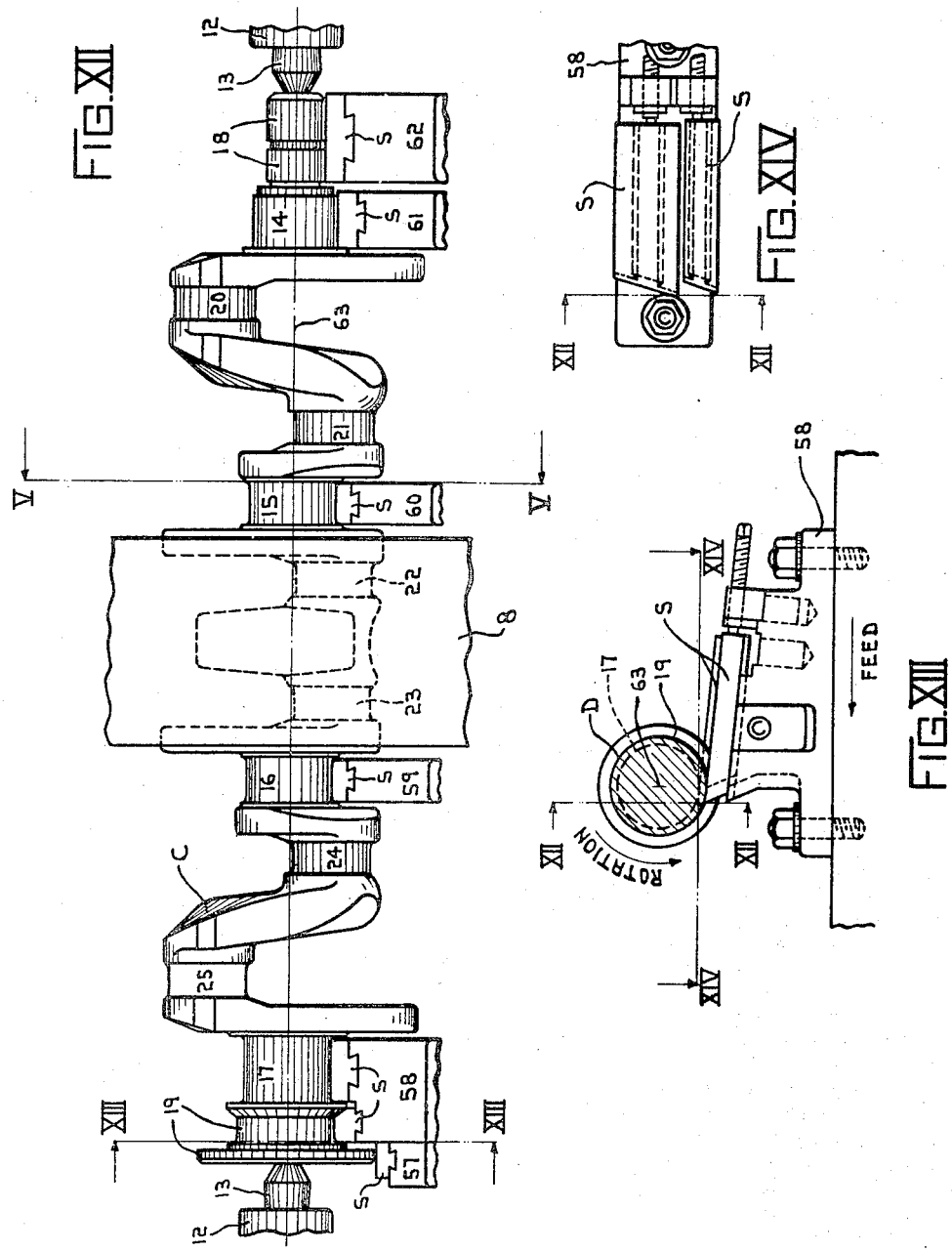

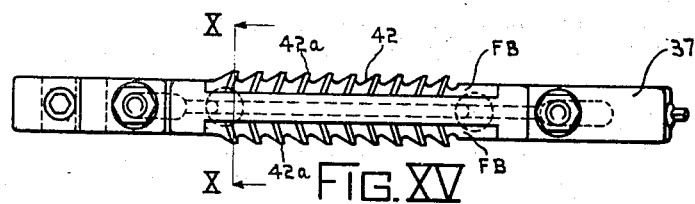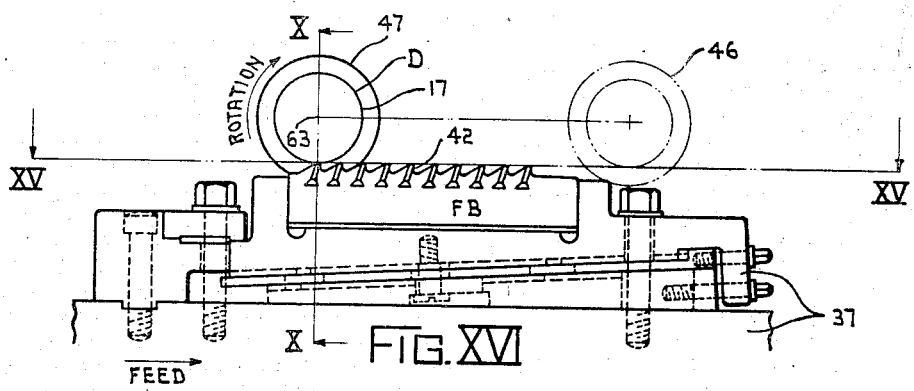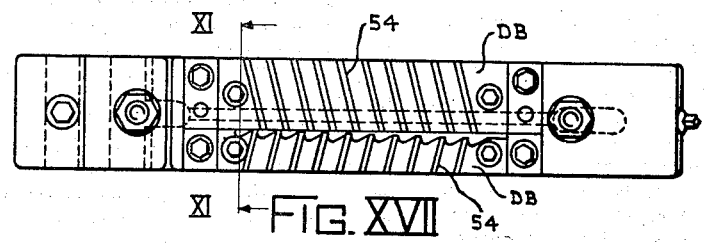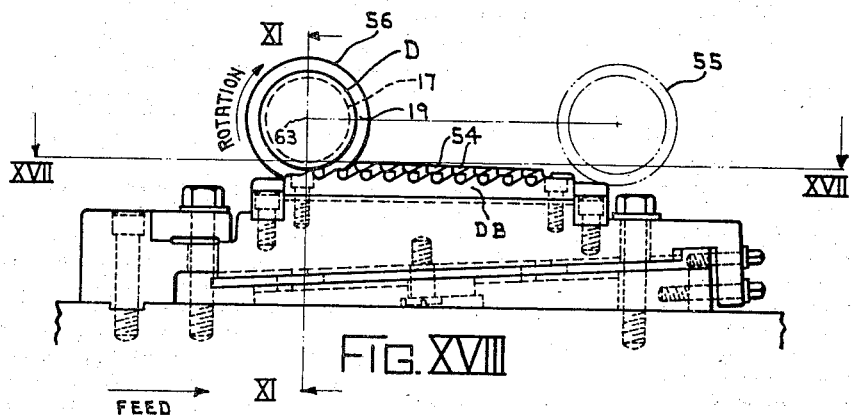

Oct. 5, 1943.                W. F. GROENE ET AL                2,330,968
            MULTIPLE SPINDLE BROACHING LATHE INDEXING MECHANISM
            Original Filed April 30, 1940    12 Sheets-Sheet 12
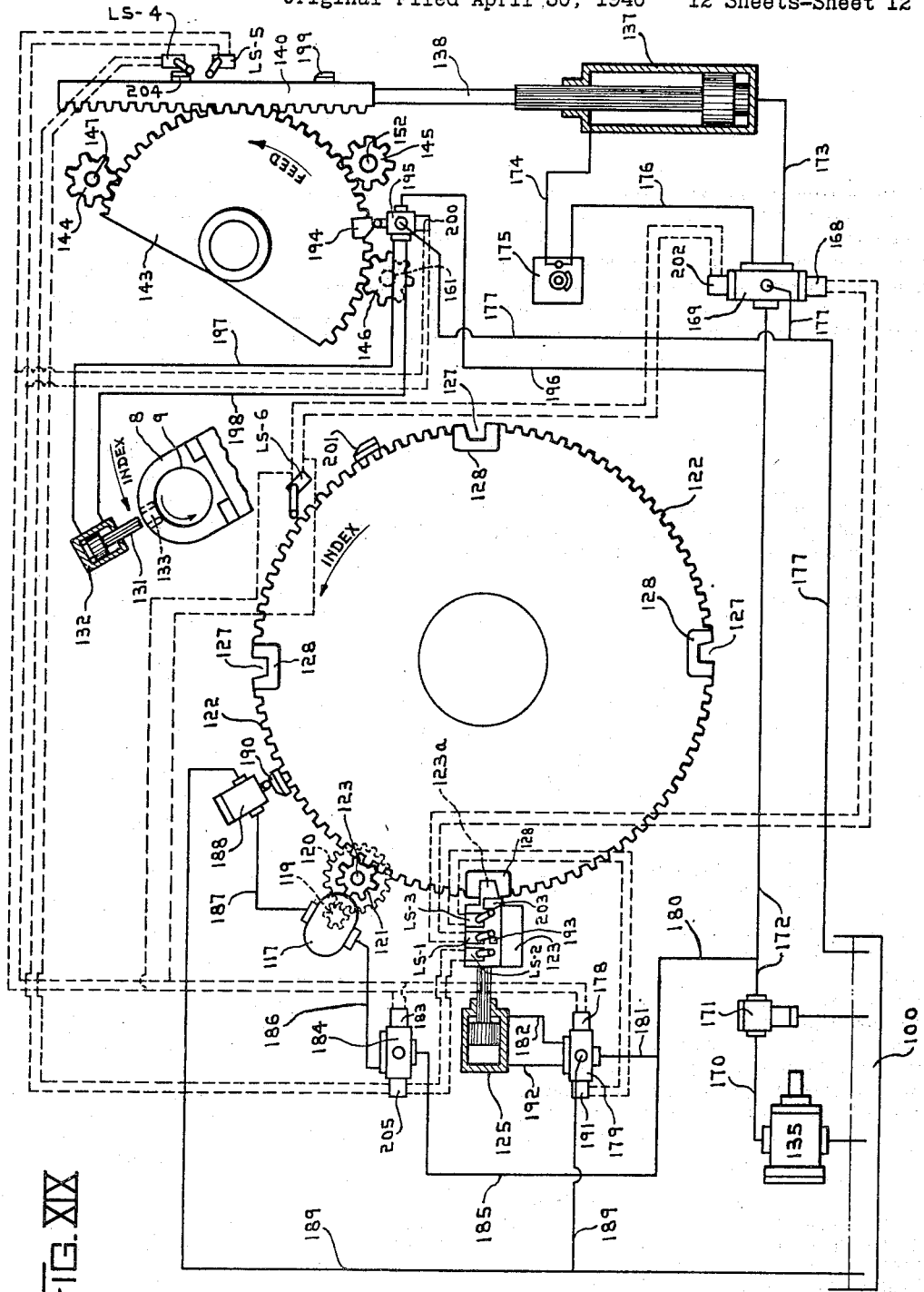
INVENTORS.
WILLIAM F. GROENE
HAROLD J. SIEKMANN
BY Willard S. Groene Patented Oct. 5, 1943

2,330,968

UNITED STATES PATENT OFFICE 2,330,968

MULTIPLE SPINDLE BROACHING LATHE INDEXING MECHANISM

William F. Groene and Harold J. Siekmann, Cincinnati, Ohio, assignors to The R. K. Le Blond Machine Tool Company, Cincinnati, Ohio, a corporation of Delaware Original application April 30, 1940, Serial No. 332,540, now Patent No. 2,280,229, dated April 21, 1942. Divided and this application December 24, 1940, Serial No. 371,570

4 Claims. (Cl. 90—57)

This invention pertains to multiple spindle broaching lathes for machining the bearing portions of multi-throw internal combustion engine crankshafts. More particularly, this invention pertains to indexing mechanism for a machine for finish machining the line bearings and associated portions of such crankshafts by means of a series of progressive metal cutting operations undertaken successively by different types of tool applications to the various bearing portions to be machined. This application is a divisional application of Serial No. 332,540 filed April 30, 1940, now Patent No. 2,280,229, granted April 21, 1942.

An object of this invention is to provide a series of progressive finish broaching and shaving steps on the line bearings of a crankshaft whereby such bearings may be finished to an extremely high degree of accuracy and in which the runout, that is the concentricity of the machined bearings relative to the true axis of rotation on the crankshaft, is well within the limits of rough grinding operations formerly necessary to accomplish this result.

It is a purpose of this lathe to machine these bearing portions by a metal cutting operation to an accuracy of .001 of an inch run-out or less by means of a series of broaching and shaving tool applications in a progressive manner. This unique arrangement is far superior to rough grinding operations heretofore undertaken which consume large amounts of productive time and are expensive because of the problem of wheel wear and the impracticability of grinding the small protruding surfaces associated with the line bearings, particularly when required to do so at high productive speeds on a plurality of bearings at the same time with great accuracy.

An object of this invention is to set forth a multiple spindle indexing machine in which a series of progressive broaching and shaving steps may be undertaken on the bearing portions of multi-throw crankshafts.

An object of this invention is to chuck the crankshaft and rotate it by suitable chucking means which supports the ends of the crankshaft on centers and provides a suitable center drive chucking mechanism intermediate these centers for rotating and supporting the crankshaft during the machining operations. It is then the object to index the crankshaft, while so held, to a work station and there to apply broaches which may first do broaching operations on certain specific parts of the line bearing portions of the shaft; then to index the crankshaft to another work station where a second series of broaches may do broaching operations on other portions of these line bearings; and then finally to index the crankshaft to a final work station where a series of shaving tools perform the final accurate sizing operations on the diameter portions of the crankshaft bearings.

A further object of this invention is to provide in a multiple spindle broaching lathe, a rotatable carrier member having a series of work spindles, each comprising a center drive chucking device and tailstocks with centers mounted on the carrier member and to provide at a series of work stages, appropriate broaching tools adapted to engages the work pieces held in the work spindles of the rotatable carrier member, which member may be indexed to bring the work pieces to the various broaching stations during the cutting cycle of the machine.

Another object of this invention is to provide in a multiple spindle broaching lathe having a rotatable carrier member and a series of work spindles on the carrier member comprising center drive chucking mechanism and tailstocks with centers for supporting a crankshaft, a series of work stations to which the crankshaft may be successively indexed by rotation of said carrier and at which are located a series of broaching cutters and shaving tool cutters for performing various shaving and broaching operations on the work piece as it is progressively indexed through the various work stations.

Another object of this invention is to provide in a multiple spindle broaching lathe, a series of work stations having a series of broaching cutting devices, and a work carrier member for progressively presenting work pieces to said work stations and to provide indexing mechanism for actuating the carrier member whereby at the completion of the machining operation at any one stage, the tools are held in fed-in position, while the work carrier member is partially indexed and then after said work carrier is partially indexed, the broaching cutters are retracted to fully withdrawn position, whereupon the indexing of said carrier member continues to bring the work pieces to the next work station for continuation of the cutting cycle.

Further features and advantages of this invention will appear from the detailed description of the drawings in which:

Figure I is a front elevation of a typical embodiment of our invention in a multiple spindle broaching lathe.

Figure II is a left hand end elevation of the machine shown in Figure I as indicated by the line II—II of Figures I and IX.

Figure III is a vertical transverse section through the lathe on the line III—III of Figures I and IX.

Figue IV is a right hand end elevation of the machine as indicated by the line IV—IV of Figure I.

Figure V is a vertical transverse section through the machine on the line V—V of Figures I, X, XI, and XII.

Figure VI is an enlarged fragmentary view of a portion of the front of the machine shown in Figure I, particularly indicating the arrangement of the control lever for stopping and starting of the work spindles when at the loading station as indicated by the line VI—VI on Figures II and VIII.

Figure VII is an enlarged fragmentary view of the cam ends for the clutch shifting rods for varying the spindle speeds and for starting and stopping rotation of the work spindles shown on the line VII—VII in Figure VIII.

Figure VIII is a fragmentary transverse section through the driving mechanism for the work spindles on the line VIII—VIII in Figures I, VI, VII, and IX, particularly showing the manual control for actuating the clutch shifter rods for spindle stopping and starting the work spindle and for operating them at low and high speeds.

Figure IX is a diagrammatic longitudinal section through the work carrier drum and driving mechanism for operating the center drive work spindles at low speed and high speed and for arresting rotation of said spindles shown substantially on the line IX—IX of Figures II and III.

Figure X is a diagrammatic view substantally on the line X—X of Figure V, XV, and XVI showing machining of the line bearing portions of a crankshaft at work station "one" where a series of face broaching tools are simultaneously applied to all of the radially extended surfaces of the line bearing portions which have been previously roughed out in a prior operation.

Figure XI is a diagrammatic view substantially on the line XI—XI of Figures V, XVII, and XVIII showing the application of a series of broaches simultaneously to all of the diameter portions of the line bearing portions of the crankshaft at station "two."

Figure XII is a diagrammatic view substantially on the line XII—XII of Figures V, XIII, and XIV, showing the simultaneous application of a series of shaving tools for the final sizing of the diameter portions of the line bearings of the crankshaft being machined at station "three."

Figure XIII is a section on the line XIII—XIII of Figure XII showing the application of the shaving tools to the machining of the diameter portions of the line bearings of the crankshaft.

Figure XIV is a plan view on the line XIV—XIV of Figures XIII.

Figure XV is a plan view of the face broaches shown on the line XV—XV of Figures V and XVI.

Figure XVI is a section on the XVI—XVI of Figure X showing the side view of the face broaching tools for machining the radially extended portions of the line bearings of the crankshaft.

Figure XVII is a plan view of the diameter broaches shown on the line XVII—XVII of Figures V and XVIII.

Figure XVIII is a side elevation in section on the line XVIII—XVIII of Figure XI showing the broaching tools for the diameter portions of the line bearings of the crankshaft.

Figure XIX is a diagram showing the electric and hydraulic control mechanism for the lathe.

General organization

As shown in Figure I, the machine comprises a base 1, upon which is mounted the upright supports 2 and 3 and on top of these supports is mounted a housing 4 which ties the upper ends of these supports together and holds them in rigid position on the base of the machine. In appropriate bearings 5 and 6, in the respective supports 2 and 3 is journaled the work spindle carrying and indexing drum 7 on which are mounted a series of center drive chuck housings 8, in which are journaled appropriate center drive ring gears 9 containing center drive chucking mechanism 10 and also the cooperating centering devices or tailstocks 11, having the usual slidably adjustable barrels 12, carrying the centers 13, which engage the ends of the crankshaft C to be machined in the lathe, whereby the crankshaft is chucked and rotated intermediate its ends and supported on its ends by these centers in the tailstocks 11.

Referring particularly to Figure V, a fundamental purpose of the drum 7 and associated parts is to index the crankshafts to be machined while carried in the center drive chucks 10 and on the centers 13 of the tailstocks 11 to a series of three work stations as designated in this figure as work station "one," work station "two," and work station "three." A "fourth" station, at which no cutting is done is designated as the loading station and is provided for inserting and removing the crankshafts C to and from the work spindles while the machining operations are taking place at the other three work stations.

Machining operations to be performed

After the work piece or crankshaft C has been loaded in the chucking and centering devices at the loading station, the drum 7 rotates in a clockwise direction, as seen in Figure V, carrying the work C into properly indexed position for cutting action at work station "one." It is to be understood that the work crankshaft, which is specifically illustrated in Figures X, XI, and XII, has been previously rough machined on the surfaces to be finished by the various machining operations to be undertaken in this machine invention; this previous roughing operation being done on a machine of a character shown, for example in Patent #1,934,976, issued November 14, 1933, or Patent #2,069,107, issued January 26, 1937.

For an illustrative purpose, the finished broaching and shaving operation to be successively carried on this machine are shown applied to the finished machining of the four line bearings, flange end, and stud end of a typical six throw four line bearing multi-throw crankshaft, shown in the Figures X, XI and XII. This crankshaft has the line bearings 14, 15, 16, and 17, and the stub end 18, and flange end 19, comprising the line bearing portions of the crankshaft to be finish broached and shaved by this lathe. The crankshaft has pin bearings 20 to 25 inclusive, which are interconnected with themselves and with the line bearings by means of appropriate interconnecting webs 26 and 34, inclusive.

Referring to Figures X, XI, and XII, the machining to be done on the crankshaft line bearing portions at work station "one" is that of simultaneously applying a series of face broaching tools, FB, carried on appropriate tool feeding devices 35, 36, 37, 38, 39, 40, and 41 which are arranged to be actuated so as to feed the broaches FB substantially tangentially of the diameter portion D, Figure XVI, of the various line bearings so that their cutting teeth 42 travel in a plane indicated by the line XV—XV of Figures V and XVI. These face broaches FB have cutting edges 42a on their sides which are arranged to engage the various radially extending face portions 43 of the line bearings and the flange 19, and the oil groove 44 and chamfer 45 of the stub end of the crankshaft to thereby simupltaneously complete the finishing to accurate axial spacing of these surfaces for proper register with the cooperating parts of the internal combustion engine in which the crankshaft is to be placed. The various broaches FB are fed as indicated in Figures V and XVI, the line bearing portions being positions relative to the broaches at 46 at the beginning of the cutting operation and reach the position 47 after the broaches have been fully fed past the line bearing portions of the crankshaft to complete the broaching of the radially extending face portions 43 of the line bearings.

The crankshaft C is then moved to work station "two" by the rotation in indexing movement of the drum 7 where the machining comprises that of simultaneously feeding a series of diameter broaching tools as best shown in Figures V, XI, XVII, and XVIII. These diameter broaching tools DB are carried on appropriate tool feeding devices 48, 49, 50, 51, 52, and 53 so that their cutting teeth 54 feed tangentially past the diameter portion D of the various line bearings in a plane indicated by the line XVII—XVII of Figures V and XVIII. The relative position of the work crankshaft at the beginning of the diameter broaching operation is shown at the position 55 of the line bearings in Figure XVIII and at the completion of the diameter broaching operation is in the relative position indicated at 56 in this figure. At this work station "two" the diameter portions are broached to an initial finished dimension of relatively high accuracy, and may be considered as an initial finish broaching operation preparatory to the final sizing of these portions to very accurate dimensions at work station "three."

Having thus completed these broaching operations the work C is then indexed to work station "three" where the finish machining of the line bearings of the crankshaft consists in applying a series of shaving tools S to the finish broached diameter portions of the crankshaft so as to bring their final dimensions to an extremely high degree of accuracy and finish. By tangentially feeding these series of shaving tools S as shown in Figures V and XIII in a tangential plane substantially as indicated by the line XVI—XVI on these figures. These shaving tools are carried on appropriate tool feeding devices 57, 58, 59, 60, 61 and 62 which effect the proper tangential feeding movement in the various shaving tools S in the plane XIV—XIV. In this last work station "three" the final accurate sizing of the line bearing diameters is accomplished by the removal of any irregularities in these work surfaces as caused by the diameter broaches DB at the work station "two" so that the resulting finish and accuracy of these diameter portions is of extremely high quality.

These shaving tools are of the typical shaving tool construction commonly used in machine tool practice having their cutting edges arranged at an angle to axis of rotation 63 of the work piece and feeding in the tangential plane XIV—XIV relative to the diameter of the work surface to be cut so that the cutting edge of these shaving tools progressively travel relatively axially across the work surface so as to produce a highly accurate finished surface on the various line bearing portions.

The work C is rotated at a predetermined speed at each of the work stations and independently of the speeds being effected at the other work stations. In this particular disclosure the work spindles are rotated at relatively high speed while at work station "one" and at work station "two," while the work is rotated at relatively low speed at work station "three," during the finish shaving operation. Means are provided for automatically causing these spindles to rotate at the predetermined speed for each of the work stations independently of one another, though operating simultaneously during the cutting operation between each indexing cycle of the drum 7. In this way the broaching operations at work stations "one" and "two" are carried on at relatively rapid spindle speeds while the final finishing operation by the shaving tools is being performed at station "three" at relatively low spindle speed to effect a very high degree of finish on the work diameters machined at this last station.

All of the tool feeding devices pointed out in Figures X, XI, and XII and as shown together in Figure V, operate simultaneously by suitable mechanisms to be described so that machining operations are simultaneously performed at all three of the work stations during the complete cutting cycle of the machine.

It is to be clearly understood that this machining procedure is well adapted to machining crankshafts from the rough forgings by appropriately constructing the broaching tools at work station "one" and work station "two" to accommodate the additional material that must be removed when rough forgings are to be machined. For instance, it is well within the scope of our invention to add one or more work stations and work spindle to the above outlined procedure, for the preliminary roughing out of the work piece with suitable broaching apparatus. Also, we may utilize two or more center drive chucking devices 10 in housings 8 for each work spindle and utilizing a chucking method outlined for example in Patents 1,843,359, 1,934,976, and 2,030,020, or any other suitable chucking device which might be used for gripping the crankshaft by means of roughing the unmachined webs. We might also incorporate a loading device as illustrated in our Patent 1,700,721 to facilitate loading of the work in the center drive work spindles. We have thus above set forth the general nature of the machining to be done in this lathe, and we will now proceed with the detailed description of the operating mechanism and functions performed by this machine to carry out the machining operations on the work piece above.

Drive for work spindles

Noting Figures I and IV, the source of driving power for rotating the work spindles is derived from the main drive electric motor 64, mounted on the bracket 65 attached to the base 1 of the machine by suitable screws 66. This motor has the usual pinion 67 adapted to drive the gear 68 carried on the main lonitgudinal drive shaft 69, appropriately carried in a bearing 70 in the trunnion 71 at the right hand end of the drum 7.

This shaft 69 extends to the left end of the drum 7, as that shown in Figure IX, where it is connected by suitable splined shaft connection 72, with the central shaft 73, journaled in bearings 74 and 75 in the indexing housing 76, which housing is appropriately fixed on the flange portion 7A of the drum 7 by suitable screws 77. On this central shaft 73 are fixed the small pinion 78 and the larger gear 79. The gear 78 simultaneously engages the four gears 80, rotatably journaled on suitable bearings 81 on each of the work spindle drive shafts 82 while the larger gear 79 simultaneously engages the smaller gears 83 also rotatably journaled on suitable bearings 84 on these drive shafts 82, so that with constant speed of rotation of the drive shaft 69 by the constant speed motor 64, the gears 80 will be rotated at relatively slow speed whereas the gears 83 will be rotated at relatively high speed on the various drive shafts 82. Associated with each of the series of gears 80 and 83, are the respective clutch mechanisms indicated at 85 and 86, whereby the respective gears 80 and 83 may be alternately connected or disconnected with respect to the various drive shafts 82, so that when clutches 85 are engaged the drive shafts are rotated at relatively slow speed from the shaft 69 and when the clutches 86 are engaged to connect the gears 83 with their drive shafts 82, these drive shafts 82 will be rotated at relatively high speed.

Suitable actuating mechanism comprising the shifting shoe 87 actuated by the shifter yoke 88 fixed on the sliding shifter rod 89 carried in the housing 76 serve to engage one or the other of the clutches 85 and 86 or to render both of said clutches inoperative when moved to an intermediate position between the clutches.

The ends of these shifting rods 89 are provided with enlarged cam ends 89a as best shown in Figures II, VII and IX, in which operate a series of fixed cam rollers 90, 91, 92, and 93, which are carried on appropriate studs 94, fixed in the upright support 2 of the machine frame. These studs 94 are variously axially projecting from the left hand face of the support 2, so as to effect an automatic shifting of the shifter bars 89, as the drum 7 and the housing 76 are rotated in indexing motion to carry the work spindles from one work station to the next. For instance, in the particular construction and arrangement illustrated in this case wherein it is the object to provide relatively high speed of rotation for the work spindle while at station "one" and station "two" and relatively low speed at station "three," the rollers 90 and 91 are carried on their respective studs projecting only a short distance out from the support 2, so that as the cam ends 89A of the rods 89, move past these rollers, they will be positioned as shown at 90 and 91 in Figure VII, so as to move the rod 89 to the right Figure IX to effect engagement of the clutch 86 for high speed drive through the gears 79 and 83 to the drive shafts 82 when their associated work spindles are at work station "one" and "two." The rollers 91 and 92 engage the cam surface 89B and ultimately ride up on the cam surface 89C as the drum 7 is indexed from loading station up to work station "one." When the drum indexes a work spindle to station "two" the rod 89 will remain to the right, Figures VII and IX, since the roller 91 is positioned the same as the roller 90 to maintain this high speed driving relationship at work station "two."

However, when the drum indexes to station "three" the roller 92 carried on its stud 94 projects far to the left from the support 2, so that it will engage the surface 89D and will thereby ultimately move the rod 89 to the left to the low speed position, the roller eventually riding up on the surface 89E as shown in Figure VII to effect operation of the clutch 85, thereby effecting a low speed drive between the gears 78 and 80 for relatively slow rotation of the drive shafts 82 for the work spindle when at work station "three."

As this spindle again rotates back to the loading station, the roller 93 carried on its stud 94, projects to an intermediate position between that of the rollers 90—91 and the roller 92, so as to return the rod somewhat to the right to a neutral position at which time neither of the clutches 85 and 86 are operative as is shown in Figure VII. Thus as the works spindle finally arrives back at the work station, it is automatically stopped from rotation and also at the same time, as this spindle rotates into the work station an automatic braking device comes into play to prevent coasting rotation of the spindle so that the operator may promptly get at the unchucking of the work from the spindle and the reloading of work in the spindle for the next cycle of operation.

This braking mechanism is shown best in Figures II and IX and comprises a spring urged shoe 95 carried on appropriate studs 96 on the bell shaped member 97, which is journaled on the bearing surface 98 of the housing 76 and is prevented from rotating with the indexing of the drum 7 and the housing 76 by the link 99 connected to the hydraulic reservoir tank 100 fixed on the base 1 by screws 118 by a suitable pin 101 and attached to the lugs 102 of the member 97, so that it does not rotate but floats on the bearing surface 98 of the housing 76, thus maintaining the brake shoe 95 in proper oriented position with respect to the indexing position of the drum 7 and housing 76. This brake shoe 95 is adapted to engage the brake drums 103, one of which is fixed on each of the drive shafts 82 and which drums 103 engage the brake shoe at the precise time that its respective work spindle is brought to the loading station. Suitable springs 104, serve to automatically allow the shoe to ride up on to the brake drums 103 as they index into the loading stations and also to provide sufficient braking pressure to permit the spindle to be rotated under manual operation when at the loading stations while at the same time providing sufficient friction for quickly arresting rotation of the works spindle when brought to the work station. In regard to this braking device, this arrangement is substantially like that shown in applicants prior Patent #2,138,522 dated November 29, 1938.

The manual operation of the work spindles when at the loading station is provided by means of the control handle 105 journaled, as best seen in Figures VI and VIII, on a suitable rock shaft 106 carried in the bracket 107 fixed to the front of the housing 2 of the machine. On this rock shaft 106 is mounted a gear 108 which engages a rack 109 on the slidably mounted stud 110 carrying the roller 111 which is provided in the same path as followed by the ends 89A of the shifter rods 89 which engage the various rollers 90, 91, 92 and 93. The movable stud 110 is so positioned that when the work spindle is in the loading station, its roller will be positioned around the roller 111 shown in Figure VII so that the lever 105 when swung to the position 105A, Figure VI, it will effect the high speed operation of the work spindle and when swung to the position 105B will effect the slow speed operation of the work spindle at the work station. When in the vertical position shown in Figure VI the respective rod 89 then stops rotation of the work spindle and the rapid coasting of the work spindle and rapid deceleration thereof will be affected by the brake shoe 95 operating on the brake drum 103 as described.

The various drive shafts 82 are respectively connected to the center drive ring gears 9 of each of the 4 work spindles as best shown in Figures III and IX. Each of the drive shafts proceed to the right inside of the drum 7 and have splined ends which fit in similar splined bores in the driving pinion 112, journaled in suitable bearings 113 in the projection 8A of the center drive housing 8. These pinions 112 in turn drive through idler gears 114 carried on suitable studs 115 also fixed in this projection 8A and drive the ring gears 9 which are journaled on appropriate bearings 116 in the housings 8.

Indexing mechanism

Mechanism for rotating the work spindle carrying drum 7 to the respective indexed positions of the various work stations and the loading station comprises a fluid pressure driven indexing motor 117 best shown in Figures I, II, and XIX, suitably fixed to the oil reservoir 100 having a driving pinion 119 secured to the power output shaft. A compound gear, comprising the large gear 120 meshing with the motor pinion 119 and the small gear 121 meshing with the large indexing gear 122, is suitably supported on a stud 123, fixed to the frame 2 of the lathe. This arrangement affords a means whereby the fluid operated indexing motor 117 is adapted to revolve the drum 7 through the large gear 182 which is fixed to the flange portion 7A of the drum 7 of the lathe.

A fluid pressure actuated indexing plunger mechanism is provided for definitely positioning the drum 7 and work spindles carried thereon in proper position relative to the work stations and work loading position, this mechanism being interlocked with the operation of the fluid indexing motor 117 in a manner to be described. This indexing plunger 123A is mounted for sliding movement in a bracket 123 fixed to the left hand side of the upright support 2 by suitable screws 124 and is arranged to be actuated by means of a suitable hydraulic cylinder 125 also carried on this bracket 123. This indexing plunger 123A has the usual chamfered end 126 which is arranged to engage the various indexing slots 127 formed on the gear 122 of the indexing blocks 128 bolted thereon by the screws 129, there being one of these blocks with an indexing notch 127 for each of the 4 indexed positions of the drum 7.

An additional indexing and steadying device is provided as best shown in Figure III which comprises a fluid pressure actuated plunger 131 carried in the housing 4 and which is actuated by a suitable hydraulic cylinder 132 in synchronized relationship with the indexing plunger 123A just described. This plunger 131 is adapted to engage in the respective indexing holes 133 in each of the center drive housings 8 when the drum 7 has been moved to an indexed position.

Tool feeding mechanism

The driving power for moving the various broaching and shaving tool feeding devices and the indexing motor 117 and cylinders 125 and 132 for the indexing plungers is derived from the fluid pressure pump 135 in the reservoir 100 which is driven by a suitable electric motor 136 to supply pressure to the feed cylinder 137, Figure IV, fastened to the base 1 of the lathe. Attached to the reciprocatable piston rod 138 of this cylinder by suitable connecting means 139 is the rack 140 which is carried in appropriate guide ways 141 in the bracket 142 fixed to the side of the upright support 3 of the lathe. This rack 140 engages the large segmental feed gear 143, which is journaled about the trunnion 71 of the drum 7 and engages the various feed pinions 144, 145 and 146. The gear 144 is fixed on the feed shaft 147 which is appropriately journaled in the housing 4 and carries on it pinions 148, Figure V, one for each of the face broaching slides 149 and 150 shown in Figure I. These pinions 148 engage appropriate racks 151 fixed on each of these slides 149 and 150 so as to effect the feeding of the tool feeding devices of Figure 5 in the line of feeding indicated by the line XV—XV as described. The gear 154 is mounted on the feed shaft 152, which is journaled in a housing 153 mounted on the base 1 between the upright supports 2 and 3 and this shaft carries suitable pinions 154 which engage racks 155 on slides 154A similar to those mounted on the housing 4 to effect feeding movements in the diameter broaching tool feeding devices along the lines XVII—XVII of Figure 5 as described. The gear 146 is appropriately mounted on a stud 156 fixed to the base 1 of the lathe and has connected thereto a pinion 157 to rotate with it which drives an idler gear 158 also journaled on a stud 159 fixed in the base 1 of the machine. This idler gear 158 in turn drives a gear 160 which is carried on the feed shaft 161 for the work station "three." This shaft 161 is journaled in an appropriate housing 162, also mounted on the base 1 of the lathe, between the upright supports 2 and 3. On this shaft 161 are fixed pinions 163 which engage racks 164 fixed on the shaving tool slides 165 and 166, shown in Figure I, so as to effect the feeding of these shaving tools S along the lines XIV—XIV as shown in Figure XII. It can thus be seen by this arrangement, actuation of the segmental gear by the cylinder 137 effects simultaneous feeding of the broaching tool feeding devices at stations "one" and "two" and the shaving tool feeding devices at station "three" along the lines of feeding indicated in Figure V.

Operation and control

The operation of this machine is substantially as follows: Referring particularly to Figure I, assuming a crankshaft to be machined has been properly inserted in a work spindle at the loading station with its ends supported on the centers 13 of the tailstocks 11 and suitably gripped intermediate its ends in the chucking mechanism 10 in the center drive ring gear; the indexing plunger 123a is fully engaged in an indexing slot 127 and the plunger 131 is engaged in the hole 133 of a center drive chuck. Under these conditions work may be in the process of being machined at the other three work stations. However, assuming there is no other work in the machine except that just placed in the work spindle at the loading station, solenoid 183 on the control valve 184 is momentarily energized cutting off fluid pressure from lines 172, 180, and 185 from entering line 186 thus rendering the hydraulic motor 117 momentarily inoperative for releasing strain on the indexing plunger 123a so it may be withdrawn from a slot 127 by energizing at the same time the solenoid 178 of control valve 179 which connects fluid pressure from line 180 and 181 to the line 182 to actuate the cylinder 125 to withdraw the plunger 123a. Exhaust fluid from this cylinder 125 passes through line 192, through the valve 179 into the drain line 189. Also at this time, the tool slides being fully withdrawn, the dog 194 on the segmental feed gear 143 engages the stem of the control valve 195 permitting fluid pressure from the lines 172 and 196 to enter line 198 to withdraw the plunger 131 from the hole 133 in the center drive head 8, exhaust fluid from this cylinder passing out through line 197, the valve 195 into the drain line 177.

The withdrawal of the indexing plunger 123a causes its dog 193 to engage and actuate the limit switch LS—2 which, through conventional electrical apparatus, deenergizes the solenoid 183 and energizes solenoid 205 to actuate the valve 184 to deliver fluid pressure to the indexing motor 117, exhausted fluid from this indexing motor passing out through line 187, through the normally inoperative deceleration valve 188 into the drain line 189 to cause the drum 7 to index to bring the loaded work spindle to work station "one."

As this indexing motion proceeds the dog 201 on the indexing gear 122 actuates the limit switch LS—6, but at this time this limit switch is rendered inoperative by the limit switch LS—4 which is now being actuated by the dog 204 on the rack 140 with the tool feeding devices fully retracted so that the indexing movement continues uninterrupted until the dog 190 fixed on the indexing gear 122 depresses the plunger of the decelerating valve 188 which restricts the discharge from the indexing motor 117 to thereby reduce the rate of indexing of the drum 7 just before the indexing plunger 123a again is ready to enter the next indexing slot 127. With the indexing motion taking place at this decelerated rate, a dog 203 is provided on the indexing gear 122 to actuate the limit switch LS—3 just as the notch 127 comes into proper register with the indexing plunger 123a to at that instant energize solenoid 191 of control valve 179 causing the index plunger 123a to be thrust into the indexing notch 127

The spindle, now loaded, has thus been positioned at work station "one" and as a result of inserting the indexing plunger 123a into the notch 127, its dog 193 actuates the limit switch LS—1 which in turn causes the solenoid 168 of the feed control valve 169 to be energized whereupon the valve 169 is actuated so as to connect fluid pressure from the fluid pressure pump 135 through the line 170, the pressure relief valve 171, and line 172, through the valve 169 to the line 173, which is connected to the bottom of the feed cylinder 137. This effects upward or feeding movement of the cylinder rod 138 and rack 140 connected to the piston of this feed cylinder. The rate of upward movement or feeding rate of this cylinder rod 138 is determined by the escape of fluid from the rod end of the cylinder 137 through the line 174, the feed rate control valve 175, which regulates the discharge through the line 174, into the line 176, and thus to the control valve 169 to the drain line 177, thus back to the fluid reservoir 100. As soon as this cylinder 137 begins its feeding operation the dog 194 on the feed segment gear 143 actuates the control valve 195 whereon fluid pressure is delivered through the line 196 through the valve to the line 197 connected to the indexing plunger cylinder 132 for moving the center drive housing indexing plunger 131 into the socket 133 in the center drive head 8. Exhaust fluid from this cylinder 132 passes out through line 198, the control valve 195, and into the drain line 177. Also at this time fluid pressure is maintained in the hydraulic motor 117 by the continuous energizing of solenoid 205 of valve 184 holding the gear 122 and drum 7 against the indexing plunger 123a in the notch 127 to prevent any shake or back lash in this mechanism.

The feed cylinder 137 continues its upward feeding movement rotating the segmental gear 143 and actuating the various feed shafts 147, 152 and 161 to actuate the broaching slides at work stations "one" and "two" and the shaving tools at work station "three." Also, as pointed out, as the work spindles in which the work was loaded is indexed to station "one," the roller 90 on the stud 94, Figure II, effects operation of the clutch 86 Figure IX causing the spindle to operate at high speed at this work station. This forward feeding motion continues and at the completion of this motion a dog 199 on the rack 140 engages a limit switch LS—5 which causes solenoid 178 of the control valve 179 to be energized for withdrawing the indexing plunger 123a and at the same time momentarily energizes the solenoid 183 to release the hydraulic indexing motor 117 from driving the gear 122 to permit easy withdrawal of the indexing plunger 123a from the indexing notch 127 in the ring gear 122. Also, the solenoid 200 of the valve 195 is energized to effect withdrawal of the plunger 131 from the center drive housing 8 by connecting fluid pressure from the line 192 to the line 198, exhaust fluid passing out through the line 191 into the drain line 177.

Withdrawal of the index plunger 123a causes its dog 193 to actuate the limit switch LS—2 which in turn energizes the solenoid 205 of the valve 184, starting up the indexing motor 117 to rotate the gear 122 and drum 7 while the tool feeding devices remain at their fully fed in position.

This indexing motion continues for a partial distance of travel of the drum 7 to the next work station until the dog 201 on the gear 122 engages the limit switch LS—6, the actuation of which energizes the solenoid 183 of the valve 184 stopping rotation of the indexing motor 117 and drum 7 and also energizes the solenoid 202 of the control valve 169 whereupon fluid pressure from the line 172 is applied to the line 176 freely through the feed rate valve 175 and the line 174 to the rod end of the feed cylinder 137, quickly returning the rack 140 and the feeding devices to their withdrawn position, exhaust fluid passing out through the line 173 to the control valve 169 into the drain line 177.

As the tool feeding devices and the feed cylinder 137 return to the fully withdrawn position as shown in Figure XIX, a dog 204 on the rack 140 actuates the limit switch which energizes solenoid 205 of the valve 184 to again effect operation of the indexing motor 117, continuing the indexing of the gear 122 and drum 7, and the deceleration of this indexing motion by the deceleration valve 188 and the ultimate insertion of the indexing plunger 123a in the next indexing notch 127, as described, thus bringing the work spindle to work station "two." This same cycle of operation takes place in bringing this work spindle to work station "three" and back to the loading station where the finished work piece is removed and an unmachined work piece is again loaded in this spindle.

The detailed description of the conventional electrical apparatus interconnecting the limit switches and the solenoids of the control valves is not set forth as this apparatus is well known in this art and forms no part of this invention.

The object of this delayed indexing motion is to permit the drum to be indexed away from working position so that the broaching tools may be withdrawn from the work pieces before the indexing continues to the next station so that during this indexing motion the tool will not mar and scratch the work as the work is indexed out of cutting position to the next station. Thus in this arrangement we have provided a broaching lathe in which the work is indexed from station to station and in which the work is indexed partially out of work engaging position at the work stations while the tool feeding devices are fully fed in position and then, after the tools have been removed to fully retracted position, the indexing is continued to bring the work to the next station.

Having thus fully set forth and described our invention, what we claim as new and desire to secure by United States Letters Patent is:

1. In an indexing mechanism, an indexing carrier, an indexing motor connected to said carrier for rotating said carrier to indexed positions, a source of power for driving said motor, a control device interconnected between said indexing motor and said source of power for connecting or disconnecting power from said motor, and means actuated by the movement of said indexing carrier to actuate said control device so as to effect a partial indexing of said indexing carrier by momentarily arresting operation of said indexing motor by disconnecting power therefrom before completing the indexing operation by further application of power to said motor.

2. In an indexing mechanism an indexing carrier, an indexing motor connected to said carrier for rotating said carrier to indexed positions, a source of power for driving said motor, a control device interconnected between said indexing motor and said source of power for connecting or disconnecting power from said motor, and means actuated by the movement of said indexing carrier to actuate said control device so as to effect a partial indexing of said indexing carrier by momentarily arresting operation of said indexing motor by disconnecting power therefrom before completing the indexing operation by further application of power to said motor, and a decelerating control device interconnected between said indexing motor and said source of power for restricting power flow to said indexing motor when actuated by the indexing movement of said carrier so as to regulate said indexing motor to cause said carrier to move at a predetermined slow rate during the completion of said indexing of said carrier.

3. In an indexing mechanism, an indexing carrier, a hydraulic indexing motor connected to said carrier for rotating said carrier to indexed positions, a fluid pressure pump connected to drive said indexing motor, a control valve interconnected between said indexing motor and said source of power for connecting or disconnecting fluid pressure from said motor, means for actuating said control valve by the movement of said carrier so as to effect a partial indexing of said carrier by momentarily disconnecting fluid pressure from said indexing motor before completing the indexing of said carrier by again applying fluid pressure to said motor.

4. In an indexing mechanism, an indexing carrier, a hydraulic indexing motor connected to said carrier for rotating said carrier to indexed positions, a fluid pressure pump connected to drive said indexing motor, a control valve interconnected between said indexing motor and said source of power for connecting or disconnecting fluid pressure from said motor, means for actuating said control valve by the movement of said carrier so as to effect a partial indexing of said carrier by momentarily disconnecting fluid pressure from said indexing motor before completing the indexing of said carrier by again applying fluid pressure to said motor, and a decelerating control valve interconnected between said fluid pressure pump and said indexing motor for restricting power flow to said indexing motor when actuated by the movement of said carrier so as to cause said motor to operate at a predetermined slow speed during the completion of said indexing of said carrier.

WILLIAM F. GROENE.
HAROLD J. SIEKMANN.